Patented Feb. 1, 1949

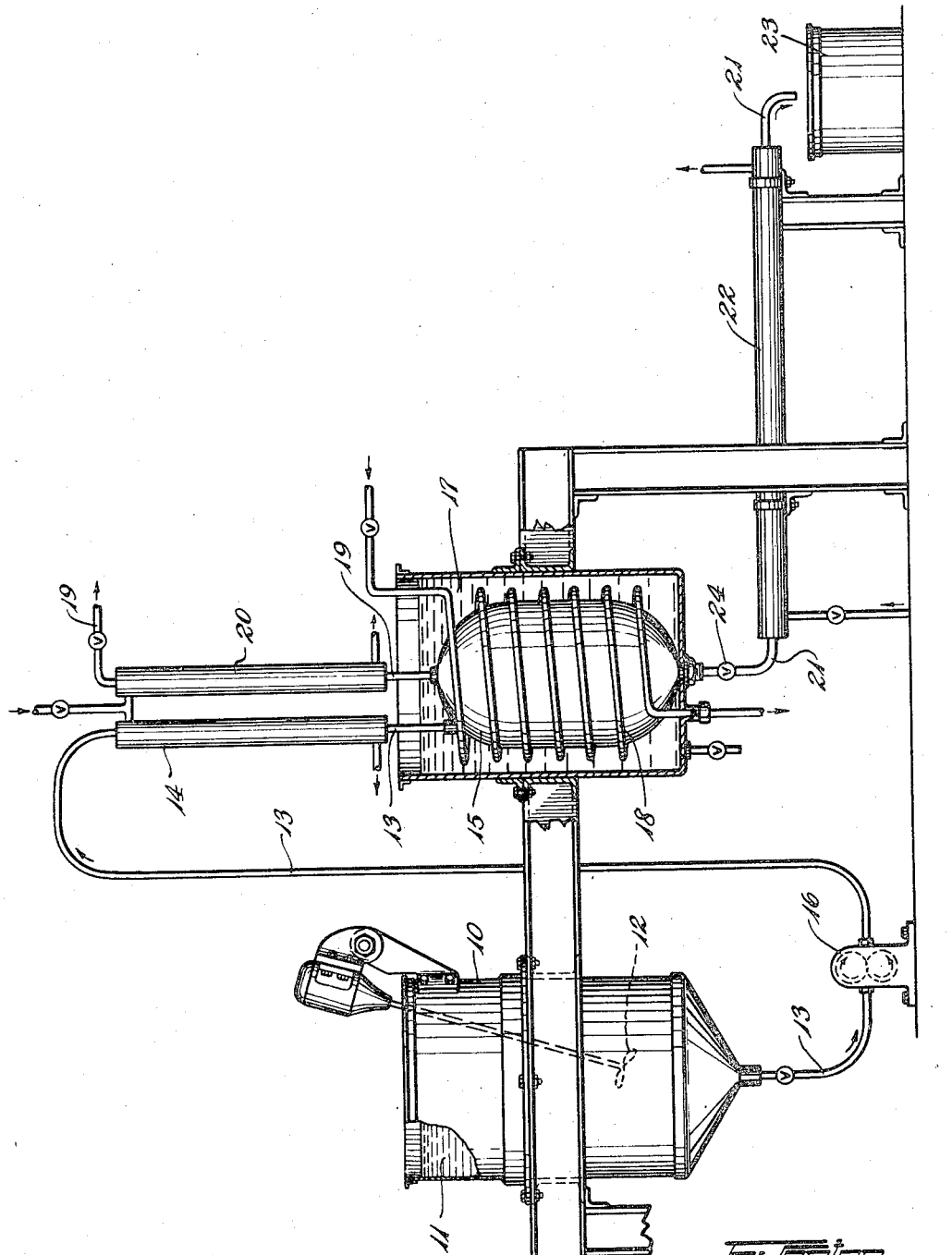

2,460,592

UNITED STATES PATENT OFFICE 2,460,592

GENERATION OF MONOMERIC FORMALDEHYDE GAS FROM FORMALDEHYDE POLYMERS

Arthur R. Miller, Jr., Akron, Ohio, assignor to The B. F. Goodrich Company, New York, N. Y., a corporation of New York Application May 1, 1945, Serial No. 591,390

5 Claims. (Cl. 260—606)

This invention relates to a method of generating a substantially pure gaseous composition of matter from its solid form, and pertains more specifically to the quantitative generation and delivery of a gaseous material from its solid form.

In the synthesis of chemical compounds, it is often necessary to employ the solid form of a reactant raw material either because the material polymerizes at ordinary temperatures or solidifies at a temperature below the ordinary room temperatures of 20 to 30° C. It would be more desirous in many cases to employ these materials in the reaction system as gases or vapors since there is more intimate contact between reactants and more thorough mixing of reactants when they are in the liquid and/or gaseous state. The conversion of the solid material to a gas or vapor in a constant known quantity has been quite difficult. The feeding of the solid into the gas or vapor generation zone has presented a serious problem due to design complications. A screw type conveyor has been proposed, but a satisfactory gas-tight conveyor for large scale production has not been developed.

The generation of the gas or vapor by heating the solid is complicated by the formation of a thin layer of charred material on the heat transfer surface which reduces the transfer of heat to the solid. In order to continue the process of generation of the gas or vapor, it would be necessary to increase the temperature of the medium heating the generating zone which not only increases production costs, but also, in the case of a generating zone heated by direct firing or hot gases, causes a premature destruction of the generating zone by "burning out."

The methods previously proposed for the generation of formaldehyde have been used only on a laboratory scale. And even then, the generation could not be quantitatively controlled. Usually paraformaldehyde is placed in a generating flask or tube and connected to a source of gas inert to formaldehyde, such as nitrogen, to sweep out the formaldehyde generated and connected also to a delivery conduit or tube. Heat is applied to the generating flask or tube by direct flame, electrical heating element, or by means of a heated bath. As the gaseous formaldehyde is generated, some of the solid is overheated and charred on the heat transfer surfaces. Consequently, more heat must be applied, which causes more charring, thereby destroying some of the solid polymeric form as well as reducing the efficiency of operation. Because of the inability to heat and insulate such a system properly, part of the formaldehyde repolymerized before leaving the generator. The rate of generation of formaldehyde is uncertain, for the rate is high at first and decreases to a negligible quantity at the end.

I have discovered a method of metering a solid into a heated zone wherein the solid is converted to a gas which eliminates the difficulties heretofore mentioned.

According to my invention, the solid is metered into a heated generation zone as a suspension of finely divided particles in a liquid carrier having a negligible vapor pressure at the temperature at which the gas is generated, whereby the solid is converted to a gas or vapor and the liquid remains unchanged, and conducting the gas through heated conduits to prevent the reforming of the solid in the conduit while transporting the gas to process.

This method has the advantages of providing not only a means of "fluidizing" the solid thereby providing the mobility required for easy handling and accurate metering, but it also provides a quantitative generation and delivery of the gas without the before mentioned difficulties.

The accompanying drawing is an elevation partially broken away and partially in section showing the equipment necessary for a complete cycle of operation in producing the gas from the solid.

A slurry of the solid to be used in generating the gas is made in the desired concentration by suspending a sufficient amount of the solid as finely divided particles in a liquid having a negligible vapor pressure at the temperature of generation. This slurry is added to feed tank 10 containing slurry 11 of the same concentration and a means of agitation 12 which keeps the solid matter in suspension without beating air into the slurry. The slurry 11 is fed from the feed tank 10 through feed line 13 through preheater 14 into flash chamber 15 by means of a metering device 16 such as a Zenith precision metering gear pump whose speed is controlled by an adjustable speed reducer (not shown) connected to a motor (not shown) by direct drive. The flash chamber 15 is heated to the desired generation temperature by an oil bath 17 which is heated by coil 18. The slurry 11 is preheated in preheater 14 to substantially the temperature of gas generation to reduce the thermal load on the flash chamber. The gas is generated partially in the preheater 14 but for the most part in the flash chamber 15. The gas released from the slurry is led to process through conduit 19 heated by steam jacket 20. The fluidizing liquid is drawn off periodically through valve 24 and drain line 21 and cooled by flowing through heat exchanger 22, cooled by any suitable means such as water, before flowing into reservoir 23.

It is to be understood that the apparatus shown in the accompanying drawing is given merely as an example of the equipment which may be used and not intended to be implied as a limitation thereof.

The generation of formaldehyde from paraformaldehyde is given as a specific example of my method of generating a substance in its gaseous state from one of its solid forms whereby the solid is fluidized and metered into the generating zone.

In an experimental operation to determine the efficiency of my new process, two absorbers (not shown) containing sodium sulfite solution are connected in series to the gas conduit 19. A 13.3% by weight slurry of powdered paraformaldehyde in di(2-ethyl hexyl) phthalate is metered at a uniform rate by a Zenith precision metering pump over a period of 2½ hours into the heated flash chamber 15 through the preheater 14 with the generated gas flowing through the heated conduit 19. The flash chamber is heated by the oil bath 17 which is heated by 150 psi gauge steam in the steam coil 18 as is the preheater 14 and the heated conduit 19.

On completion of operation, it is found that the first absorber gained 0.92 lbs. in weight and the second absorber had no gain in weight. 6.08 lbs. of spent di(2-ethyl hexyl) phthalate is recovered from the flash chamber 15 which contains 0.02 lbs. of formaldehyde by analysis. Since the original slurry contained 13.3% paraformaldehyde, the weight of the slurry fed is $$\frac{6.08-0.02}{1-0.133}$$

or 6.98 lbs. Thus, the difference between the amount fed and the amount recovered, 6.98−6.08=0.90 lb. represents the calculated weight of the generated formaldehyde and water vapor. The weight of the formaldehyde and water vapor collected in the absorber is 0.92 lb. which is within experimental error.

Thus, it is evident that formaldehyde can be quantitatively generated by my method in its gaseous state from one of its solid forms without the disadvantages hereinbefore stated.

In the generation of formaldehyde from paraformaldehyde, it is not necessary to limit the concentration of the paraformaldehyde to 13.3%, for slurries of 50% or above are sufficiently stable to handle and fluid enough to pump by means of a precision metering pump. Thus, the generation of formaldehyde can be regulated not only by adjusting the output of the metering pump but also by the metering of a slurry of any desired concentration up to 50% or above.

Other liquids may be used to replace di(2-ethyl hexyl) phthalate as a fluidizing agent providing they also have a negligible vapor pressure at the temperature of generation. For example, there can be substituted for di(ethyl hexyl) phthalate such liquid materials as diffusion pump oils; high molecular weight esters of carboxylic acids, such as the n-octyl phthalate, diethylene glycol monooleate, 2-ethylhexyl sebacate, glycerol monostearate diacetate, decyl phthalate, glycol dioleate, oleyl phthalate, or ethylene glycol oleate phthalate, and others; olive oil; soybean oil; castor oil; tricresyl phosphate; liquid high molecular weight organic siloxanes (sometimes called "polysilicones"); and the like.

In the generation of formaldehyde it is not necessary to limit the solid form to paraformaldehyde, for slurries of alpha or beta polyoxymethylene can be used with substantially the same quantitative efficiency of generation.

This method can also be used to depolymerize such polymers as polystyrene, polymethyl methacrylate, and others, by selecting fluidizing liquids which will not undergo thermal decomposition during the depolymerization. Castor oil, among others, is suitable as a fluidizing medium.

There are many organic compounds which because of their temperatures of boiling or sublimation can be generated in a gaseous state by my method hereinbefore described. For example, such compounds as acetamide, alanin, orthoamino phenol, analine hydrochloride, benzanilide, d-borneol, d-camphoric acid, 1-chlor-anthraquinone, metachloro benzoic acid, cumic acid, 4,4′-dihydroxy-diphenyl, beta dinaphthol, furoic acid, parahydroxy benzaldehyde, hydroxy quinoline, methyl anthraquinone, oxalic acid, phthalimide, quinone, salicylic acid, thiosalicyclic acid, trinitro benzoic acid, and others, can be fluidized as a solid and generated in a gaseous state by fluidizing the finely divided solid with a liquid having a negligible vapor pressure, not over about 10 to 15 m. m. Hg, and will not undergo thermal decomposition at the temperature at which the above materials boil or sublime. Care must also be taken to select a liquid which will not react with the solid used.

Such inorganic compounds as aluminum chloride, phosphorous penta-chloride and phosphorous pentoxide could be introduced into reaction systems in a gaseous state by my method with the selection of a proper fluidizing agent such as a liquid "polysilicone" with which the compounds will not react or cause thermal decomposition to take place. By my method, these materials may be introduced in quantitative amounts which would be exceedingly desirable when they are employed for their catalytic powers.

According to my invention, a solid material may be quantitatively introduced into a reaction system and make continuous a process which had been intermittent or batchwise because of a lack of a suitable means of supplying a solid reactant.

When this method is used for the generation of formaldehyde, the formaldehyde can be introduced in a controllable continuous flow in the formation of formaldehyde resins such as urea-formaldehyde, phenol-formaldehyde, etc., the ketene-formaldehyde reaction, or the hydrogenation of formaldehyde.

While I have herein disclosed specific embodiments of my invention, I do not thereby desire or intend to limit myself solely thereto, but to include all the obvious variations and modifications falling within the spirit and scope of the appended claims.

I claim:

1. A method of generating substantially pure monomeric formaldehyde from a polymer of formaldehyde which comprises metering said polymeric form into a heated generating zone as a suspension of finely divided particles in a liquid carrier having a vapor pressure of not exceeding 15 m. m. Hg at 200° C., whereby the polymeric form is converted to formaldehyde and the liquid carrier remains unchanged.

2. A method of generating substantially pure monomeric formaldehyde from a polymer of formaldehyde which comprises metering said polymeric form into a heated generating zone as a suspension of finely divided particles in a liquid carrier having a vapor pressure of not exceeding 15 m. m. Hg at 200° C., whereby the polymeric form is converted to formaldehyde and the liquid carrier remains unchanged, and conducting the formaldehyde to process through conduits heated to prevent polymerization.

3. A method of generating substantially pure formaldehyde from paraformaldehyde which comprises metering said paraformaldehyde into a heated generating zone as a suspension of finely divided particles in a liquid carrier having a negligible vapor pressure at 200° C., whereby the paraformaldehyde is converted to formaldehyde and the liquid carrier remains unchanged, and conducting the formaldehyde to process through conduits heated to prevent repolymerization.

4. A method of generating substantially pure formaldehyde from paraformaldehyde which comprises metering said paraformaldehyde into a generating zone heated to 175–200° C. as a suspension of finely divided particles in a liquid carrier having a vapor pressure of not more than 10 m. m. Hg at 200° C., whereby the paraformaldehyde is converted to formaldehyde and the liquid carrier remains unchanged, and conducting the formaldehyde to process through conduits heated to 175–200° C. to prevent repolymerization.

5. A method of generating substantially pure formaldehyde from paraformaldehyde which comprises metering said paraformaldehyde into a generating zone heated to 175–200° C. as a suspension of finely divided particles in di(2-ethyl hexyl) phthalate, whereby the paraformaldehyde is converted to formaldehyde and the liquid carrier remains unchanged, and conducting the formaldehyde to process through conduits heated to 175–200° C. to prevent repolymerization.

ARTHUR R. MILLER, JR.

REFERENCES CITED

The following references are of record in the file of this patent:

UNITED STATES PATENTS

| Number | Name | Date |
| --- | --- | --- |
| 676,814 | Feval | June 18, 1901 |
| 762,845 | Rauchenberg | June 14, 1904 |
| 1,536,908 | Morgan | May 5, 1925 |
| 1,687,312 | Ripper | Oct. 9, 1928 |
| 1,892,396 | Jaeger | Dec. 27, 1932 |
| 2,113,230 | Ceccon | Apr. 5, 1938 |
| 2,328,621 | Crawford | Sept. 7, 1943 |

FOREIGN PATENTS

| Number | Country | Date |
| --- | --- | --- |
| 27,656 | Great Britain | 1896 |